US012716291B2

(12) United States Patent
Phillips

(10) Patent No.: US 12,716,291 B2
(45) Date of Patent: Aug. 25, 2026

(54) SYSTEM AND METHOD FOR STRUCTURALLY ENHANCED ROLL-DROP STABILITY ASSEMBLY

(71) Applicant: Brian Oliver Phillips, Woodruff, SC (US)

(72) Inventor: Brian Oliver Phillips, Woodruff, SC (US)

( * ) Notice: Subject to any disclaimer, the term of this patent is extended or adjusted under 35 U.S.C. 154(b) by 219 days.

(21) Appl. No.: 18/601,678

(22) Filed: Mar. 11, 2024

(65) Prior Publication Data

US 2024/0301686 A1 Sep. 12, 2024

Related U.S. Application Data

(60) Provisional application No. 63/451,130, filed on Mar. 9, 2023.

(51) Int. Cl.

| | |
|---|---|
| ***E06B 9/44*** | (2006.01) |
| ***A63J 1/02*** | (2006.01) |
| ***B65H 75/24*** | (2006.01) |
| ***E04B 2/74*** | (2006.01) |

(52) U.S. Cl.

CPC .................................... *E06B 9/44* (2013.01); *A63J 1/02* (2013.01); *B65H 75/24* (2013.01); *E04B 2/74* (2013.01); *A63J 2001/022* (2013.01)

(58) Field of Classification Search

CPC ..... E06B 9/42; E06B 9/44; E06B 9/64; E06B 9/11; E06B 9/13; E06B 9/08; A63J 1/02; A63J 2001/022; E04B 2/74; E04C 2003/0495; B65H 75/24

USPC ........................................................ 242/613.5

See application file for complete search history.

(56) References Cited

U.S. PATENT DOCUMENTS

| | | | | |
|---|---|---|---|---|
| 479,081 | A * | 7/1892 | Stephenson | E01D 6/00 14/15 |
| 1,345,097 | A * | 6/1920 | Mousette | E06B 9/44 160/264 |
| 1,424,572 | A * | 8/1922 | King | E06B 9/44 242/613.5 |
| 3,398,779 | A * | 8/1968 | Kuss | E06B 9/64 160/243 |
| 4,632,050 | A * | 12/1986 | Rupp | B63B 35/14 114/221 R |
| 7,028,742 | B2 * | 4/2006 | Sears | E06B 9/64 160/310 |
| 10,162,255 | B2 * | 12/2018 | Kasahara | G03B 21/58 |
| 12,037,844 | B2 * | 7/2024 | Menendez | E06B 9/44 |
| 12,037,845 | B2 * | 7/2024 | Klimes | E06B 9/44 |
| 2005/0077017 | A1 | 4/2005 | Ramsey | |

* cited by examiner

*Primary Examiner* — Abe Massad

(74) *Attorney, Agent, or Firm* — Moore & Van Allen PLLC

(57) ABSTRACT

Embodiments of the present invention disclose a roll-drop curtain assembly having enhanced stability for supporting curtains of a variety of materials while maintaining structural integrity, shape, and form of the overall assembly itself. The invention utilizes a series of one or more tension cables operatively coupled to the distal end plates of a roll-drop assembly and traversing the length of an inner portion of the roll-drop assembly in a specific manner. The design effectively applies a high degree of tension force to the inner walls of the roll-drop assembly, resulting in increased structural rigidity of the roll-drop assembly overall.

20 Claims, 5 Drawing Sheets

SYSTEM AND METHOD FOR STRUCTURALLY ENHANCED ROLL-DROP STABILITY ASSEMBLY

CROSS-REFERENCE TO RELATED APPLICATIONS

This application is a non-provisional application of and claims priority to U.S. Provisional Application No. 63/451,130, filed on Mar. 9, 2023, the contents of which are also incorporated herein by reference.

FIELD

This application relates generally to the field of roll-drop curtain assemblies, and, more particularly, to a roll-drop curtain assembly having enhanced stability for supporting curtains of a variety of materials while maintaining structural integrity, shape, and form of the overall assembly.

BACKGROUND

Roll-drop curtain assemblies are commonly used in the field of theater and performance venues in order to provide a visual barrier between the stage and audience that can be deployed or retracted as desired. Additionally, roll-drop curtain assemblies may have applications for use as temporary privacy dividers for large event spaces, such as ballrooms, gymnasiums, or the like. Roll-drop assemblies may also be used to support vinyl, plastic, or fabric materials which can be deployed for use as projection screens, advertising graphics, or the like. Typically, a roll-drop assembly consists of a roll of fabric, vinyl, or other rollable, pliable, or foldable material, which can be rolled around, or unrolled from, a drum assembly, thereby allowing a user to either raise or lower (retract or deploy) the material at their convenience. In some cases, roll-drop assemblies may include a power source and a motor which actuate the drum attached to a fabric or curtain material, whereby the rotating movement of the drum acts to wrap or unwrap the fabric or curtain material in order to raise or lower a rolled material relative to a floor surface. In either a retracted or deployed state, it is known that heavy fabrics or other pliable materials may place concentrated strain on portions of the roll-drop assembly, drum, outer housing, end point connections, or various other supporting means or components of the assembly. In addition, the weight of the housing, internal components, or the like, of the roll-drop assembly may cause the assembly to sag or bend over time if it can only be mounted at two distal end points.

In order to maintain a pleasant visual appearance of the rolled and unrolled material, reduce concentrated wear on specific portions of the roll-drop assembly, and ensure structural stability overall, there is a need for an improved system and method for ensuring the structural integrity of roll-drop assemblies such that the assembly maintains a flat, parallel disposition with respect to the floor, ground, ceiling, or the like, across the entire length and width of the roll-drop assembly. An ideal solution would not substantially increase the weight or size footprint of the roll-drop assembly by nature of this reinforcement.

BRIEF SUMMARY

In light of the needs described above, according to a broad aspect of an embodiment of the present invention, described herein is an improved system and method for structurally enhanced roll-drop stability assembly. The structurally enhanced roll-drop stability assembly, or "assembly," as referred to throughout this disclosure, includes a reinforced drum and housing structure comprised of a series of concentric pipes, tubes, bars, tension cables, and other components used to support the structural integrity of the assembly in order to ensure that it remains substantially rigid, and in ideal embodiments, completely rigid, under heavy loads. It is noted that while "cables" are referred to throughout this disclosure, one of ordinary skill in the art will appreciate that other means of providing tension to the assembly are contemplated, including wires, ropes, or the like.

Conventional solutions take multiple approaches to designing a roll-drop assembly that retains structural integrity and shape under heavy loads; however, each of these approaches has been shown to have significant drawbacks. For instance, conventional systems may include using thicker, heavier materials for the drum assembly, which adds complexity and risk to the installation of the assembly and requires additional support above or around the assembly in order to ensure safety. Additionally, the increased cost of obtaining drum housings with thickness and material specifications required to achieve complete rigidity may be prohibitive, as these components may involve custom specifications which are not produced on a mass scale or are not otherwise widely available. In other embodiments, conventional drum assemblies may include additional external supports, external clamps, or the like, or various stiffeners, hanger attachments, or protrusions which attempt to keep the drum assembly from sagging under heavy loads. Again, these components frustrate the installation process and cause undue complexity to the operation and maintenance of the assemblies, in addition to the obvious drawback of added cost due to additional material. As such, the majority of conventional solutions introduce added material cost, weight, and size to the overall assembly structure. There is a need for a solution that acts to reinforce the drum assembly of a roll-drop structure in such a way that is contained within the footprint of a conventional roll-drop assembly, utilizes readily available and relatively low-cost materials, and does not require the use of many additional external components, fasteners, supports, or the like, which add weight to the assembly and/or increase its overall footprint to an extent that would make it incompatible with some venues or otherwise draw attention in an unseemly fashion.

The improved roll-drop assembly of the present invention offers multiple benefits with respect to conventional roll-drop assemblies and solutions. For instance, the reinforced system described herein substantially reduces, or completely eliminates, the amount that the roll-drop assembly bends, sags, or bows due to a heavy weight of material raised or lowered by the roll-drop assembly, effectively ensures that the assembly remains safe to use for a longer period of time by reducing premature wear on specific portions of the assembly due to repeatedly bending and relaxing metal components, results in a more even power demand for motorized components, and also ensures that the material of the curtain (or other raised or lowered material) is not wrinkled or damaged during rolling or unrolling due to bunching or sagging around the drum. This also results in a more pleasing appearance of a deployed curtain or fabric material on a consistent basis. As described throughout the disclosure, the primary means for achieving the improved stability of the roll-drop assembly of the invention is the use of specifically selected cables connected to either end of the roll-drop assembly within the interior of the assembly itself. The cables are placed in a specific manner and tensioned to a specific degree of force, thereby providing an even tension across an inner tube of the roll-drop assembly and preventing the assembly from sagging, bending, or bowing across its length. Additionally, due to the nature of the reinforcing components being placed within the housing of the assembly, the overall footprint of the assembly remains unchanged in ideal embodiments. By utilizing cables with a high degree of tensile strength relative to their weight and size, the overall weight of the assembly is also not significantly increased relative to conventional assemblies. Thus, the present invention can be retrofitted in locations where existing roll-drop assemblies may already be in place, provides the benefit of increased structural integrity and capacity for heavier loads, and achieves both goals while remaining price-competitive to conventional systems.

As such embodiments of the invention relate to a system and method for a structurally enhanced roll-drop stability assembly, the invention generally comprising: a housing structure extending longitudinally and having opposing distal ends comprising end plates; a rotatable drum located within the housing structure for winding and unwinding the flexible sheet material; anchoring means located at or near each of the distal ends of the housing structure; one or more stabilizing members within the housing structure arranged to maintain the structural integrity of the roll-drop assembly; and a plurality of tensile members connected to the anchoring means and configured to provide tension across the housing structure, wherein the tensile members interact with the stabilizing members to prevent sagging and deformation.

In some embodiments, the tensile members comprise adjustable cables, wherein adjusting the adjustable cables varies tension across the housing structure of the roll-drop assembly system.

In some embodiments, the invention further comprises a tension adjustment mechanism operably connected to the tensile members for selectively increasing or decreasing tension force.

In some embodiments, the guide assemblies further include openings through which the tensile members are threaded.

In some embodiments, the anchoring means include plates with apertures configured for securing ends of the tensile members.

In some embodiments, the housing structure is cylindrical and the guide ring assembly is configured to provide concentric support within the housing structure.

In some embodiments, the flexible sheet material is selected from the group consisting of: fabric, vinyl, plastic, and composite materials.

In some embodiments, the guide ring assembly further comprises additional supporting material attached to a circular edge via one or more spokes, the one or more spokes.

In some embodiments, the end plate is positioned on the interior recesses of the assembly and constructed from a material selected from the group consisting of steel, titanium alloys, and anodized aluminum, with a surface treatment for corrosion resistance.

In some embodiments, the guide ring assembly is operatively coupled to the interior wall of the housing structure at a midpoint with respect to the longitudinal axis.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein.

DETAILED DESCRIPTION

Figure 1A:
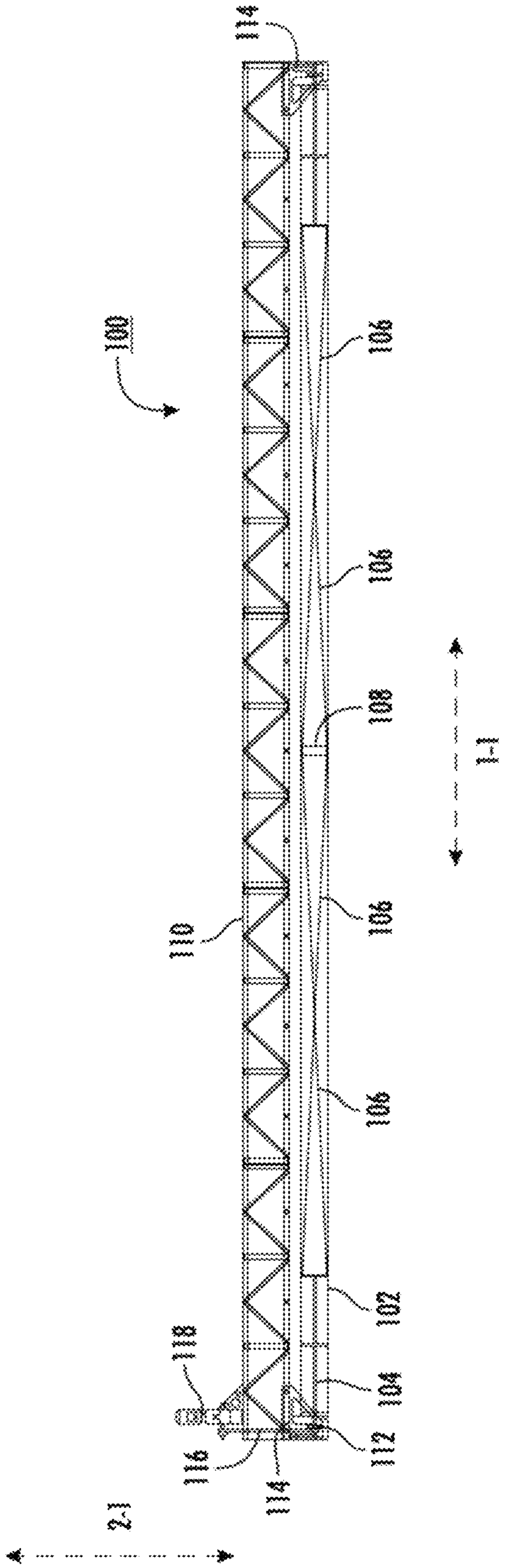
FIGS. 1A and 1B illustrate an orthographic perspective view of an embodiment of structurally enhanced roll-drop stability assembly 100 in comparison to an orthographic perspective view of an embodiment of a non-enhanced roll-drop assembly 120, in accordance with some embodiments of the disclosure.

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms “a” and/or “an” shall mean “one or more.”

It should be understood that “operatively coupled,” or “operatively connected” when used herein, means that the components may be formed integrally with each other, or may be formed separately and coupled or connected together. Furthermore, “operatively coupled” or “operatively connected” means that the components may be formed directly to each other, or to each other with one or more components located between the components that are operatively coupled or connected together. Furthermore, “operatively coupled” or “operatively connected” may mean that the components are detachable from each other (e.g., via a lock and pin arrangement, a bolt-on arrangement, or the like), or that they are permanently or semi-permanently coupled together (e.g., welded, bonded, riveted, bolted, screwed-on, or the like).

It should be understood that "tension force" when used herein, refers to the mechanical force applied along the length of the tension cables, which is measured in pounds or newtons, and is used to maintain the structural integrity of the roll-drop assembly by preventing sagging and bending under the weight of the deployed material.

It should be understood that "load bearing capacity" when used herein, describes the maximum weight or force that the roll-drop assembly can support. In some embodiments, "load bearing capacity" specifically refers to the maximum weight or force that the roll-drop assembly can support without experiencing deformation, failure, or loss of structural integrity, as determined by the materials used, design of the assembly, and the configuration of its components, or the like.

It should be understood that "guide ring assembly" when used herein, refers to the component or series of components within the roll-drop assembly that serves to direct, position, and maintain one or more tension cables in a manner that promotes even distribution of tension forces throughout the system.

It should be understood that "structural rigidity" when used herein, refers to the ability of the roll-drop assembly to maintain its shape and resist deformation under stress, which is achieved through the use of materials, design considerations, and the application of tension forces that prevent bending and flexing.

It should be understood that "anchoring point" when used herein, denotes a specific location or component on the roll-drop assembly where tension cables are securely fastened in order to apply and maintain tension force, which is critical for the assembly's stability and operation, or the like.

It should be understood that "friction interaction" when used herein, relates to the contact forces that resist the relative motion between components of the roll-drop assembly, such as between the tension cables and the guide ring assembly, which are engineered to be minimal to reduce wear and prolong the lifespan of the assembly.

It should be understood that "corrosion resistance" when used herein, refers to the property of materials used in the roll-drop assembly to withstand degradation caused by environmental factors such as humidity, temperature fluctuations, and exposure to chemicals, which is essential for maintaining the assembly's durability and functionality over time.

It should be understood that "adjustment mechanism" when used herein, pertains to the system or method implemented within the roll-drop assembly that allows for the precise setting and alteration of the tension force applied by the tension cables, which is key for customizing the assembly's performance based on specific load requirements.

It should be understood that "wear and corrosion" when used herein, are terms that describe the deterioration and degradation processes affecting the roll-drop assembly components, where "wear" refers to the mechanical erosion from regular use, and "corrosion" pertains to the chemical breakdown of materials, both of which are mitigated through material choice and design to ensure long-term reliability of the assembly.

FIG. 1A illustrates an orthographic side perspective view of an embodiment of structurally enhanced roll-drop stability assembly 100 in comparison to an isometric perspective view of an embodiment of a non-enhanced roll-drop assembly 120, in accordance with some embodiments of the disclosure. As shown in FIG. 1A, indicated by numbering 100 is the structurally enhanced roll-drop stability assembly, or the "assembly" as sometimes referred to herein, as compared to a non-enhanced roll-drop assembly 120, or the "conventional assembly" as sometimes referred to herein. The assembly 100 features an innovative design aimed at evenly distributing load and maintaining a uniform, non-deformable profile, even under variable weight conditions. The assembly 100 contains an outer housing portion 102 (e.g., a housing structure, or the like). In the form of a substantially cylindrical shaped pipe oriented longitudinally along axis 1-1. Contained within the outer housing portion 102 is a drum 104 which can be rotationally actuated in order to cause an attached sheet of fabric, vinyl, or other material to be raised or lowered along a vertical axis 2-1. The rotational mechanism of the drum 104 is designed for smooth operation, reducing stress on the motor during the raising and lowering of heavy curtains (e.g., a rotatable drum, or the like). [.] The outer housing 102 is attached to two brackets 114 located on either end of the assembly 100, used to attach the assembly to a mounting truss structure 110. These brackets 114 are strategically designed to provide strong support points that accommodate the reinforced nature of the assembly without requiring additional structural modification to the mounting truss 110. Depicted atop the mounting truss structure 110, on the left-hand portion of FIG. 1A, is a power motor 118. The power motor 118 is a powered component used to actuate drive shaft 116, which is used to actuate the drum 104 via a gear assembly 112. This setup facilitates a direct and efficient transfer of power, ensuring reliable and consistent movement of the curtain. It is understood that this embodiment is shown for exemplary purposes only with respect to the components used to actuate the drum 104, and one of ordinary skill in the art will appreciate that this is not meant to limit the invention to this exact configuration of mounting of a power source to actuate or rotate the drum 104.

As further shown in FIG. 1A, the assembly 100 further comprises one or more tension cables 106 which traverse at least a portion of the interior of the outer housing 102. These tension cables 106 are a critical component of the enhanced structural design, functioning to apply a balancing force that resists bending and deformation. The one or more tension cables 106 are fed through one or more rings in the center of the assembly 100 which are fit concentrically within the inner wall of the outer housing 102. The configuration of the tension cables and their interaction with the guide ring assembly are central to the innovative force distribution that characterizes the enhanced stability of assembly 100. These rings are indicated in FIG. 1A as guide ring assembly 108. The placement of these rings is optimized for distributing the tension forces evenly across the length of the assembly, preventing stress concentrations that could lead to warping. As shown in FIG. 1A, the guide ring assembly 108 is depicted as a series of strategically positioned rings within the housing structure. These rings serve as vital stabilizing members and are optimized to distribute the tension forces uniformly across the length of the assembly. The design and placement of the guide ring assembly 108 are specifically engineered to counteract potential stress concentrations which, if unchecked, could result in warping or bending of the assembly. Through this configuration, the guide ring assembly 108 ensures that the load is not focused on any single point along the housing structure, thereby maintaining the structural integrity and desired straightness of the roll-drop assembly over time and use.

It is understood that the guide ring assembly 108 may be one or more "puck-like" ring components that are operatively coupled to the interior wall at the midpoint of the outer housing 102 with respect to axis 1-1. The selection of materials for the guide ring assembly 108, be it polymer or metal, is based on a comprehensive analysis of tension dynamics, ensuring long-term resilience of the assembly under cyclic loading conditions. It is understood that the guide ring assembly 108 may be constructed of any suitable material required to withstand the tension force strength of tension cables 106. In some embodiments, the guide ring assembly may be constructed from a polymer material. In other embodiments, the guide ring assembly 108 may be constructed from a metal material, depending on the specifications and requirements of the location where the assembly 100 will be installed. In some embodiments, the metal material of the guide ring assembly 108 undergoes a surface treatment process such as galvanization, anodizing, or powder coating, to enhance its corrosion resistance, ensuring longevity even in environments with high humidity or corrosive elements. Additionally, to facilitate minimal friction interaction with the tension cables 106, the metal surfaces that come into contact with the cables may be machined to a smooth finish and treated with a low-friction coating such as Teflon (PTFE) or a suitable lubricant-infused material, which preserves the integrity of the cables and contributes to the overall smooth operation of the assembly. The one or more metal rings of the guide ring assembly 108 contain multiple circular openings which allow for the one or more tension cables 106 to be fed through the guide ring assembly 108. In the embodiment depicted in assembly 100, there are two tension cables 106: (1) a first tension cable 106 which is attached to the bottom left-hand distal end portion of the assembly 100, feeds up through the top of the guide ring assembly with respect to vertical axis 2-1, and transverses down from the midpoint section, where the guide ring assembly 108 is located to terminate at the bottom right-hand distal end portion of the assembly 100; and (2) a second tension cable 106 which is attached to the upper left-hand distal end portion of the assembly 100, feeds down through the bottom of the guide ring assembly 108 with respect to vertical axis 2-1, and transverses up from the midpoint section, where the guide ring assembly 108 is located, in order to terminate at the upper right-hand distal end portion of the assembly 100. This strategic placement and orientation of the tension cables 106 create a balanced, symmetrical tension system that enhances the structural rigidity and stability of the assembly. In order to achieve a tension force outward on the inner surface of the assembly 100, the tension cables are tightened from either end of the assembly 100 in order to achieve a desired tension force that acts on the guide ring assembly 108. The tensioning process involves precise force measurements to ensure uniform tension distribution and optimal structural integrity. It is understood that the number of tension cables 106 may vary according to each embodiment. For instance, in some embodiments, there may exist four or more separate cables terminating equidistant from one another around the concentric circular portion of either distal end of the assembly 100. It is understood that these additional tension cables 106 can be added to accommodate larger assemblies or those intended to support heavier materials without compromising stability.

Figure 1B:
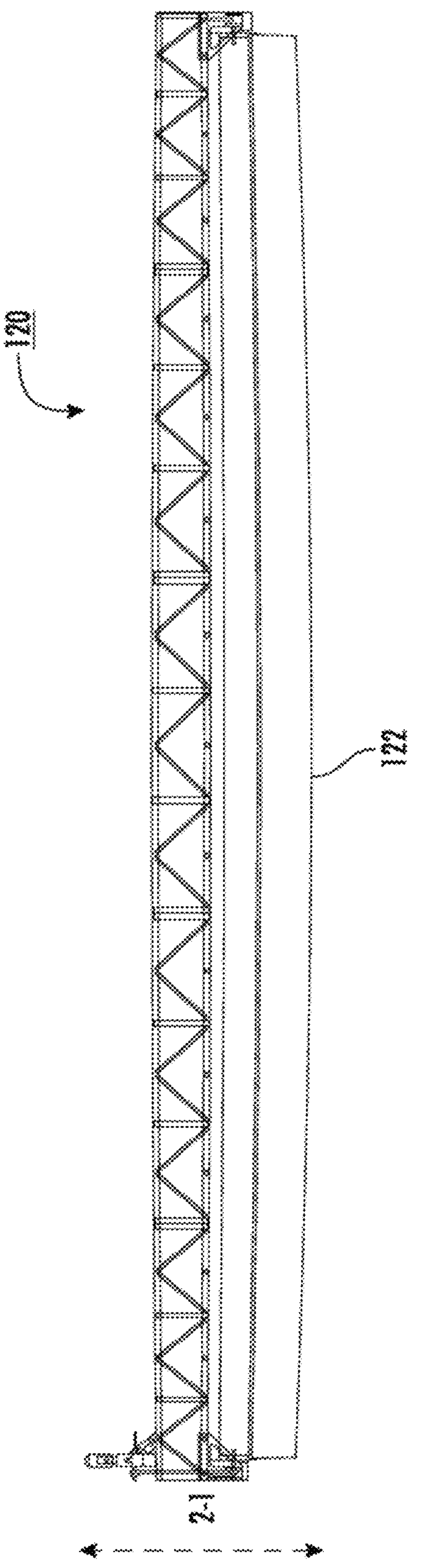
Prior Art Figure 1B

As further indicated in FIG. 1B, an orthographic side perspective view of an embodiment of a non-enhanced roll-drop assembly 120 is shown below the assembly 100. With respect to the assembly 100, the assembly 120 is missing the guide ring assembly 108 and the one or more tension cables 106. Therefore, the structural integrity of the assembly 120 depends on the strength and rigidity of the material used for the drum 104 and outer housing 102. However, it lacks the innovative tension system that characterizes assembly 100, making it susceptible to deformation under stress. As depicted in Figure [1] 1B, the assembly 120 is slightly deformed or "bowed" with regard to the vertical axis 2-1. The midpoint of the assembly 120, without added structural support of the tension cables 106 of assembly 100, sags or bows downward due to the weight of the curtain or other material 122, the weight of the assembly 120 itself, and by nature of being operatively coupled to the mounting truss structure 110 from two distal ends of the assembly 120. This sagging can lead to operational inefficiencies and potentially hazardous conditions over time. One of ordinary skill in the art will appreciate that as a non-enhanced roll-drop assembly sits in a single orientation for extended periods of time, (e.g., in a "storage" orientation, where the curtain or other material is retracted and concentrated around the drum, or the like), this may cause sagging or affect the overall straightness or symmetry of the non-enhanced assembly. Such conditions not only detract from the aesthetic appeal but also impair the functional longevity of the assembly. Additionally, as the non-enhanced roll drop assembly sags, bows, or otherwise deforms, the material around the drum can be bunched, wrinkled, or deformed in some way that would cause a user or operator to expend additional time or effort in order to straighten or return the curtain material to its original form. This could also lead to increased maintenance costs and downtime for repairs. Further, one of ordinary skill in the art will also appreciate that as wrinkles or deformities in the material 122 are produced, and the material is retracted or deployed repeatedly, this can cause the drum 104 to malfunction or fail as the material continues to deform, bunch, or the like. The risk of mechanical failure presents a significant drawback in the conventional design that assembly 100 successfully mitigates. This deforming process can eventually cause permanent structural damage to the outer housing 102 of a non-enhanced assembly. Therefore, the improvements offered by the enhanced design of assembly 100 are not only functional but also contribute to the safety and durability of the roll-drop systems in demanding theater and event environments, or the like.

Figure 2A:
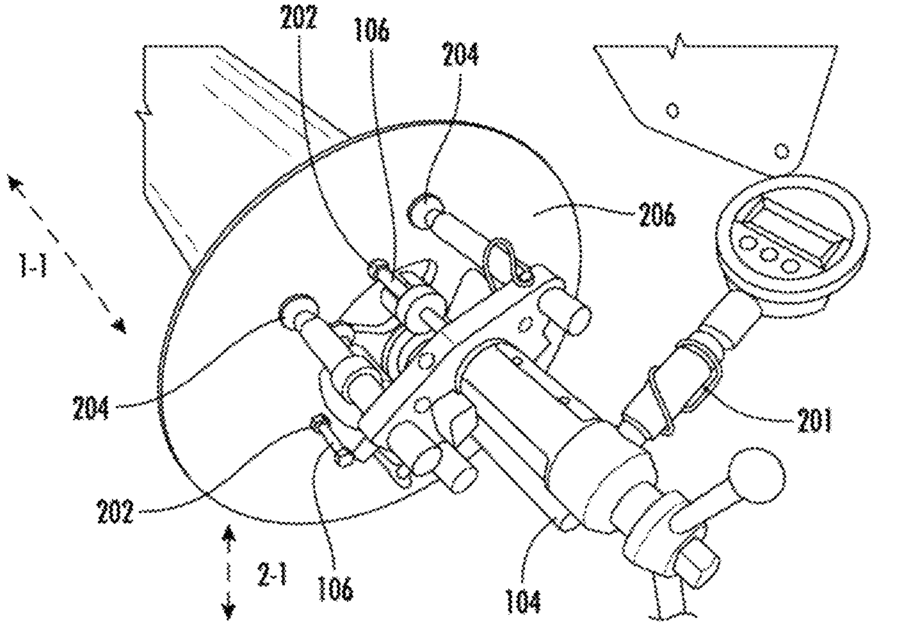
FIG. 2A and FIG. 2B each illustrate an isometric view of an end portion of assembly 100, in accordance with some embodiments of the disclosure.
Figure 2B:
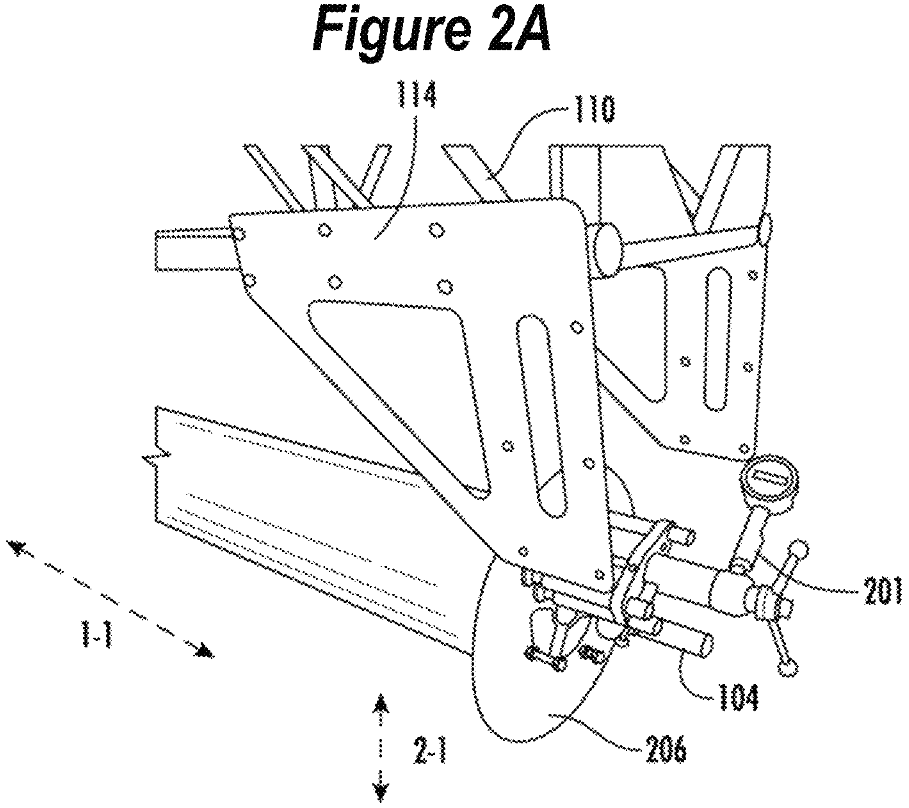

FIG. 2*a* and FIG. 2*b* each illustrate an isometric view of a distal or terminal end portion of assembly 100, in accordance with some embodiments of the disclosure. As shown in FIG. 2*a*, an end plate 206 exists on each distal or terminal end portion of the assembly 100. In some embodiments, the end plate 206 is a steel plate with a thickness of 0.375 ($3/8^{th}$) inches or more. The choice of steel for the end plate 206 provides the necessary strength and stability to serve as an effective anchoring point for the tension cables 106, while the specified thickness ensures durability against the mechanical stresses experienced during use. The end plate 206 acts as an anchoring point for tension cables 106 as well as a solid flat surface that aids in applying tension force to the tension cables 106 such that an operator can achieve the desired structurally supportive and reinforcing effect of the invention. In some embodiments, the end plate 206 may be positioned on the interior recesses of the assembly 100. This positioning within the recesses serves to streamline the profile of the assembly, maintaining the aesthetic and functional integrity of the system. As shown in FIG. 2*a*, tension cables 106 are fed through tension cable guide holes 202 in the end plate 206. It is understood that the tension cable guide holes 202 are precisely machined to accommodate the tension cables without causing undue wear or abrasion. Also shown in FIG. 2*a* is a hydraulic pull testing assembly 201 used to apply a desired tension force to the tension cables 106. Tension force is applied to the tension cables 106 by attaching an end of a tension cable 106 to the hydraulic pull testing assembly 201, anchoring the hydraulic pull testing assembly 201, via anchors 204, to the end plate 206 of the distal portion of the assembly 100, and applying a specific degree of tension force to the tension cable 106 via use of the hydraulic pull testing assembly 201. This process is critical for ensuring that the cables are tensioned correctly, optimizing the structural reinforcement provided by the assembly. The tension cables 106 are pulled through the tension cable guide holes 202 to a certain degree of tension force, and then secured using a coupling attachment on the exterior of the end plate 206. This coupling attachment is designed to lock the tension in place, preventing slippage or loss of tension over time.

In some embodiments, the operator may use the hydraulic pull testing assembly 201 to apply tension force by means of twisting a turning handle with integrated nut on the hydraulic pull testing assembly 201. The turning handle is ergonomically designed for ease of use, allowing for precise adjustment of the tension force without requiring excessive physical effort from the operator. The tension force applied to the tension cable 106 is measured using a digital gauge of the hydraulic pull testing assembly 201. This gauge provides an accurate and easily readable tension measurement, facilitating precise calibration of the tension cables. In some embodiments, each tension cable 106 is tensioned to at least 2,500 pounds of tension force; however, it is noted that, depending on the size of the assembly 100, the materials used for the assembly 100, or the curtain material supported by the assembly 100, a different tension force may be desired in other embodiments. The capacity to adjust the tension force is a critical feature, allowing the system to be tailored to a wide range of materials and environmental conditions. As noted, in other embodiments, the end plate 206 may be positioned inside the assembly 100. In such cases, one or more of the tension cables 106 may first be securely attached to the end plate 206, and the end plate 206 may then be pulled back toward the end of the hydraulic pull testing assembly 201 in order to increase the tension on the tension cables 106 to a desired force. This internal positioning of the end plate 206 also serves to protect the tensioning mechanism from external environmental factors that could impact performance. A slightly wider orthographic perspective view is shown in FIG. 2*b* to indicate how the assembly 100 is typically positioned relative to brackets 114 and the mounting truss structure 110. The positioning showcases the integration of the assembly 100 within the broader system, highlighting how the enhanced design maintains compatibility with standard mounting configurations, or the like.

Figure 3:
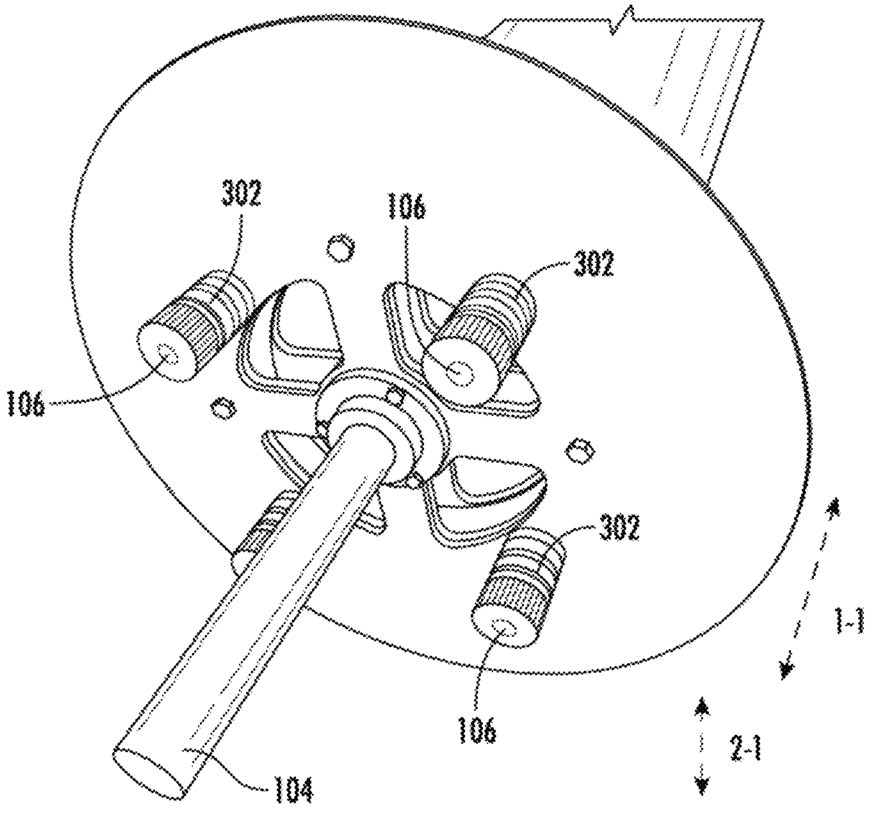
FIG. 3 illustrates an isometric view of a distal end portion of assembly 100 after tensioning is applied, in accordance with some embodiments of the disclosure.

FIG. 3 illustrates an isometric view of a distal end portion of assembly 100 after tensioning is applied, in accordance with some embodiments of the disclosure. As shown in FIG. 3, a coupling nut 302 is fastened to the end of each tension cable 106 in order to ensure that the tension cable remains taught to the desired specification. The coupling nut 302, which is specifically engineered for high-tensile applications, is a key component of the tension system, providing a robust, fail-safe connection that maintains the integrity of the tension across the assembly. It is understood that other means of fastening or securing the tensioning cables 106 after tensioning is applied may be feasible (e.g., welding, or the like), and that this specific embodiment is not intended to limit the scope of the invention but rather provide an exemplary embodiment of how the tension cables 106 may be fastened to the end plate 206 each of the distal ends of assembly 100. The depicted coupling mechanism offers a convenient and reliable method for adjusting and maintaining the tension within the system, allowing for easy field adjustments and maintenance without the need for specialized equipment.

The isometric perspective of FIG. 3 showcases the mechanical advantage provided by the coupling nuts 302, which distribute the tension force evenly from the cables 106 into the drum assembly 104. This balanced force distribution is critical in preventing deformation and ensuring uniform load handling during the raising and lowering of curtains or screens. The design also facilitates the rapid assembly and disassembly of the tension system, which can be particularly advantageous in portable installations or where routine maintenance requires disassembly. Moreover, the precise machining of the coupling nuts 302 and the tension cables 106 ensures a seamless integration with the end plate 206, contributing to the overall compact and efficient design of the assembly 100. The coupling nuts 302 are designed to endure the rigors of frequent use, and, in preferred embodiments, are constructed from materials such as stainless steel, titanium alloys, or anodized aluminum, known for their high tensile strength and resistance to environmental stressors. It is understood that high-quality materials selected for the coupling nuts 302 resist wear and corrosion, extending the service life of the assembly under a variety of environmental conditions.

FIG. 3 also underscores the attention to detail in the design of the assembly 100, where every component is optimized for strength, longevity, and ease of use. The visual contrast between the robust coupling nuts 302 and the tension cables 106 serves as an example of the engineering approach which enables an efficient and durable design. Furthermore, this arrangement allows for a visual inspection to confirm that tension is properly applied and maintained, which is vital for safety and performance consistency. Ultimately, the interplay of components as depicted in FIG. 3 is emblematic of the assembly 100 design philosophy, which prioritizes not only structural integrity and performance but also user accessibility and serviceability.

Figure 4A:
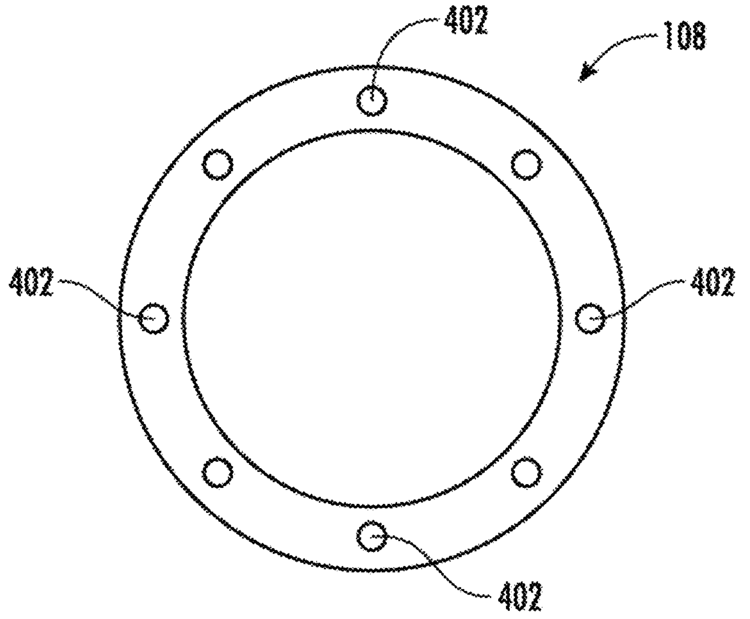
FIG. 4A illustrates a two-dimensional orthographic perspective view of a first embodiment of a guide ring assembly, in accordance with some embodiments of the disclosure.

FIG. 4*a* illustrates a two-dimensional orthographic perspective view of a first embodiment of a guide ring assembly 108, in accordance with some embodiments of the disclosure. It is understood that the guide ring assembly 108 may be structured in a number of different embodiments in order to achieve the desired tension effect. In each embodiment, the outer edge of the guide ring assembly 108 is in contact with, coupled with, pressing against, or supporting the inner side of the cylindrical assembly 100 housing. In some embodiments, as shown in FIG. 4*a*, the guide ring assembly 108 includes a substantially circular ring which is designed to sit concentrically within the outer housing of the assembly 100 surrounding the drum. This circular design facilitates an even distribution of tension from the cables 106, which is understood as being vital for maintaining the structural integrity of the assembly during use. As shown, the guide ring assembly 108 includes one or more tension cable guide holes 402 through which the tension cables 106 are fed through the guide ring assembly 108. The guide holes 402 are precision-engineered to ensure a snug fit for the tension cables 106, thereby reducing lateral movement and potential wear over time.

Figure 4B:
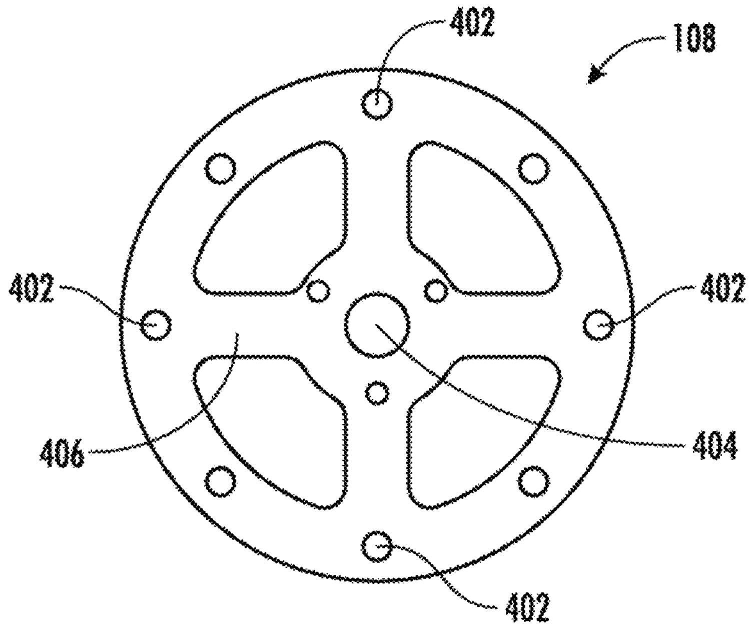
FIG. 4B illustrates a two-dimensional orthographic perspective view of a second embodiment of a guide ring assembly, in accordance with some embodiments of the disclosure.

FIG. 4*b* illustrates a two-dimensional orthographic front perspective view of a second embodiment of a guide ring assembly, in accordance with some embodiments of the disclosure. As shown in FIG. 4*b*, the guide ring assembly 108 may include additional supporting material toward the inner radius of the ringed structure. The added material provides enhanced structural support and rigidity, which is particularly beneficial for assemblies subjected to higher loads or more frequent use. In some embodiments, the supporting material may attach to the circular edges of the guide ring assembly 108 via one or more spokes 406. The spokes 406 are designed to resist bending and torsional forces that the assembly may encounter during the raising and lowering of heavy materials. As indicated in the embodiment shown in FIG. 4*b*, the spokes may convene at a central area of the guide ring assembly 108 in order to form an inner circular opening 404 where the drum 104 can be fed through the guide ring assembly 108. The inner circular opening 404 is crucial for providing access for the drum while also contributing to the overall concentric alignment of the tension system. In this way, the guide ring assembly 108 can apply supportive force to the drum assembly 104 as well as the outer housing of the assembly 100. The integration of these elements into a singular assembly underlines the innovative approach to enhancing stability without compromising the form factor or increasing the footprint of the roll-drop system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A reinforced roll-drop assembly system for supporting a flexible sheet material, comprising:

a housing structure extending longitudinally and having opposing distal ends comprising end plates;

a rotatable drum located within the housing structure for winding and unwinding the flexible sheet material, wherein the rotatable drum extends longitudinally along a longitudinal axis from each of the opposing distal ends, and wherein the rotatable drum defines a gap between the opposing distal ends where a portion of the rotatable drum is absent;

an anchor located at or near each of the distal ends of the housing structure;

one or more stabilizing members within the housing structure arranged to maintain structural integrity of the roll-drop assembly; and a plurality of tensile members connected to the anchor and configured to provide tension across the housing structure, wherein the tensile members interact with the stabilizing members to prevent sagging and deformation.

2. The roll-drop assembly of claim 1, wherein the tensile members comprise adjustable cables, wherein adjusting the adjustable cables varies tension across the housing structure of the roll-drop assembly system, and wherein the tensile members are configured to be adjusted external to the housing structure.

3. The roll-drop assembly system of claim 1, further comprising a tension adjustment mechanism operably connected to the tensile members for selectively increasing or decreasing tension force.

4. The roll-drop assembly system of claim 1, further comprising guide assemblies with openings through which the tensile members are threaded.

5. The roll-drop assembly system of claim 1, wherein the anchor includes plates with apertures configured for securing ends of the tensile members.

6. The roll-drop assembly system of claim 1, wherein the housing structure is cylindrical and further comprising a guide ring assembly configured to provide concentric support within the housing structure.

7. The roll-drop assembly system of claim 1, wherein the flexible sheet material is selected from the group consisting of: fabric, vinyl, plastic, and composite materials.

8. The roll-drop assembly system of claim 1, further comprising a spoked guide ring assembly including an additional supporting material attached to a circular edge via one or more spokes.

9. The roll-drop assembly system of claim 1, wherein the end plates are positioned on interior recesses of the assembly and constructed from a material selected from the group consisting of steel, titanium alloys, and anodized aluminum, with a surface treatment for corrosion resistance.

10. The roll-drop assembly system of claim 1, wherein a guide ring assembly is operatively coupled to an interior wall of the housing structure at a midpoint with respect to a longitudinal axis.

11. A method of reinforcing a roll-drop assembly for supporting a flexible sheet material, the method comprising:

providing a housing structure extending longitudinally with opposing distal ends comprising end plates;

positioning a rotatable drum within the housing structure for winding and unwinding the flexible sheet material, wherein the rotatable drum extends longitudinally along a longitudinal axis from each of the opposing distal ends, and wherein the rotatable drum defines a gap between the opposing distal ends where a portion of the rotatable drum is absent;

locating an anchor at or near each distal end of the housing structure;

arranging one or more stabilizing members within the housing structure to maintain structural integrity; and connecting a plurality of tensile members to the anchor to provide tension across the housing structure, wherein the tensile members interact with the stabilizing members to prevent sagging and deformation.

12. The method of claim 11, wherein the tensile members comprise adjustable cables, wherein adjusting the adjustable cables varies tension across the housing structure of the roll-drop assembly system, and wherein the tensile members are configured to be adjusted external to the housing structure.

13. The method of claim 11, further comprising selectively increasing or decreasing tension force through a tension adjustment mechanism operably connected to the tensile members.

14. The method of claim 11, further comprising guide assemblies with openings through which the tensile members are threaded.

15. The method of claim 11, including securing ends of the tensile members using the anchor that comprises plates with apertures.

16. The method of claim 11, wherein providing a housing structure includes utilizing a cylindrical housing structure and configuring a guide ring assembly to provide concentric support within the housing structure.

17. The method of claim 11, further comprising selecting the flexible sheet material from the group consisting of fabric, vinyl, plastic, and composite materials for use in the roll-drop assembly system.

18. The method of claim 11, wherein arranging one or more stabilizing members includes attaching additional supporting material to a circular edge of a guide ring assembly via one or more spokes.

19. The method of claim 11, further comprising positioning the end plates on interior recesses of the assembly, wherein the end plates are constructed from materials selected from the group consisting of steel, titanium alloys, and anodized aluminum, and treated for corrosion resistance.

20. The method of claim 11, further comprising operatively coupling a guide ring assembly to an interior wall of the housing structure at a midpoint with respect to a longitudinal axis.

* * * * *